United States Patent [19]

Armstrong et al.

[11] Patent Number: 5,503,406

[45] Date of Patent: Apr. 2, 1996

[54] ASSEMBLY FOR LIVE LOADING OR VALVE PACKINGS

[75] Inventors: Leonard T. Armstrong, Worcester; Raymond P. Champagne, Sterling; John M. Cory, Hopkinton, all of Mass.; Anthony P. Lennon, Lisbon, Conn.

[73] Assignee: Neles-Jamesbury, Worcester, Mass.

[21] Appl. No.: 157,302

[22] Filed: Nov. 26, 1993

[51] Int. Cl.$^6$ ........................................... F16J 15/18
[52] U.S. Cl. ........................................ 277/106; 277/2
[58] Field of Search .................... 277/2, 66, 98, 277/99, 106; 251/214; 132/551, 553

[56] References Cited

U.S. PATENT DOCUMENTS

| | | |
|---|---|---|
| 1,721,325 | 7/1929 | Wilson . |
| 2,679,378 | 5/1954 | Uhler . |
| 3,375,013 | 3/1968 | Grantom ........................................ 277/2 |
| 4,718,445 | 1/1988 | Lundberg et al. ................... 137/553 X |
| 4,886,241 | 12/1989 | Davis et al. . |
| 4,911,408 | 3/1990 | Kemp . |
| 5,056,757 | 10/1991 | Wood . |
| 5,064,167 | 11/1991 | DiPalma . |
| 5,129,625 | 7/1992 | Wood et al. . |
| 5,131,666 | 7/1992 | Hutchens . |
| 5,190,264 | 3/1993 | Boger . |
| 5,192,049 | 3/1993 | Ridge . |
| 5,230,498 | 7/1993 | Wood et al. . |
| 5,290,010 | 3/1994 | Ridge ................................. 277/106 X |
| 5,316,319 | 5/1994 | Suggs ................................. 251/214 X |

FOREIGN PATENT DOCUMENTS

| | | |
|---|---|---|
| 0494064 | 7/1992 | European Pat. Off. . |
| 86140 | 6/1869 | France . |
| 2777 | of 1869 | United Kingdom ................... 277/106 |
| 22061 | of 1906 | United Kingdom ................... 277/106 |

OTHER PUBLICATIONS

Jamesbury Specifications Bulletin W151–5, Wafer–Sphere Butterfly Valves with Live–Loaded Shaft Seals.

*Primary Examiner*—Scott W. Cummings
*Attorney, Agent, or Firm*—Oblon, Spivak, McClelland, Maier & Neustadt

[57] ABSTRACT

A valve having an assembly for live loading of the packings of the valve. The assembly includes a plurality of large belleville disk springs arranged such that the shaft or stem of the valve extends through the center of the belleville springs, with threaded studs arranged symmetrically with respect to the valve shaft also extending through the belleville springs. Utilizing the larger spring arrangement, a smaller number of springs are required, and favorable deflection characteristics are provided. Preferably, a compression ring is provided having a portion extending up through the belleville disk springs, with this portion including a visual indicator thereon which provides a visual indication that a desired load is achieved as the springs are loaded via hex nuts provided on the threaded studs of the valve assembly.

20 Claims, 2 Drawing Sheets

5,503,406

ASSEMBLY FOR LIVE LOADING OR VALVE PACKINGS

BACKGROUND OF THE INVENTION

1. Field of the Invention

The invention relates to valve assemblies, and particularly to an improved assembly for live loading of valve packings.

2. Discussion of Background

Typically, a valve will include a movable stem which is used for moving the valve between two or more positions (e.g., between open and closed positions, or among various positions in the case of a variable valve). Generally, the valve is either a linear valve, in which the valve stem moves in the axial direction of the stem, or a rotary valve in which the valve stem rotates about its axis for changing the valve position. In either case, a packing is often provided to prevent leakage (along the valve stem) of the fluid passing through the valve. In order to maintain a sufficient seal, the packing is typically loaded with a spring force to provide a "live loading". The spring force applies pressure to the valve packing to maintain an adequate seal, and also to compensate for any consolidation or wear of the packing over a period of time.

FIGS. 1 and 2 show conventional arrangements for providing a valve packing with a live loading. As shown in FIG. 1, the loading can be accomplished by a plurality of springs 30 in the form of a stack of belleville springs mounted over the valve shaft or valve stem 32. A compression plate 34 is provided with a recessed portion 34a for accommodating the spring stack, with the compression plate also receiving the valve shaft 32 and threaded studs 36. When the nuts 38 are tightened upon the studs 36, the spring stack is compressed, and imparts a compressive force to the valve packing via ring 31.

FIG. 2 shows an alternate conventional arrangement in which a stack of belleville springs 40 is provided about each of the stud shafts 46. Upon tightening of the nuts 48, the springs 42 are compressed, thereby loading the valve packing.

As the valve is used over a period of time, the packings can wear or consolidate. The consolidation of the packing causes a reduction in the amount of force provided by the belleville springs (i.e., unless the assembly is further tightened), thus risking the possibility of leakage. Accordingly, it is extremely important to provide a load upon the packing which will prevent leakage even after the packing has consolidated over a period of time, while avoiding excessive loading which can result in excessive friction between the packing and the valve stem.

Often, a large loading is required to provide a satisfactory seal with the packings. With conventional arrangements, a high loading undesirably requires an increase in the number of springs. In addition, with conventional live loading arrangements, it can be difficult to determine the point at which a desired load is achieved such that satisfactory initial loading is provided, and such that the loading continues to be sufficient even after the packing consolidates. Moreover, an arrangement as shown in FIG. 1 requires the compression plate 34 to be machined to include a recessed portion 34a in order to reduce the height of the assembly, and/or for proper positioning of the compression plate with respect to the springs 30. The FIG. 2 arrangement is further disadvantageous in that a large number of springs are required, and it is difficult to achieve a desired uniform loading with the separate spring arrangements provided for each stud. The arrangements of FIGS. 1 and 2 are also disadvantageous in that a large number of springs must be added to achieve high loads.

Accordingly, an improved arrangement for providing a live loading of the packing of a valve is needed. Preferably, such an arrangement or assembly should be of a relatively simple construction, and should also be relatively easy to use such that a particular desired loading can be readily achieved in a highly reliable manner, even where the loading requirements are high. Such an arrangement should be suitable for retrofitting existing valves, and should also be capable of accommodating wear or consolidation of the packing, such that a satisfactory load is maintained on the valve packing even after extended periods of use.

SUMMARY OF THE INVENTION

Accordingly, it is an object of the present invention to provide an arrangement for live loading of the packings of a valve assembly.

It is a further object of the present invention to provide a live loading assembly in which a relatively small number of parts are required to accomplish the live loading, with the attainment of a desired load accomplished in a relatively simple manner.

It is another object of the present invention to provide an arrangement for live loading of the packings of a valve assembly in which a plurality of disk or belleville springs are provided, each of which receives both the central shaft or stem of the valve as well as the threaded studs which are disposed about the valve stem.

It is yet another object of the invention to provide an improved live loading assembly which is suitable for retrofitting of existing valves.

It is a still further object of the invention to provide a live loading assembly in which the compression ring assists in guiding/positioning of the springs, with the compression ring also assisting in ensuring proper loading.

These and other objects and advantages are achieved in accordance with the present invention in which a plurality of belleville or disk springs are provided with a central aperture which receives the valve stem or shaft. In addition, the belleville springs are provided as significantly larger springs as compared with conventional arrangements, with additional apertures provided in the springs for receiving threaded shafts or studs disposed about the valve stem. With this arrangement, in accordance with the present invention, it has been recognized that high loads can be reliably and accurately achieved without requiring a large number of springs, since the amount of deflection for a given load increases as the size of the belleville spring increases (with the deflection for a given load related to the square of the diameter of the belleville spring). In addition, by utilizing larger springs which include additional holes to accommodate the valve bonnet fasteners (threaded studs), a visual indicator can be conveniently utilized such that the mechanic or installer can tighten the hex nuts of each shaft in a reliable manner to achieve the desired loading upon the packing of the valve.

In accordance with another advantageous aspect of the present invention, a compression ring is provided which includes a portion extending between the valve stem and the belleville springs in order to guide the springs and provide a uniform load to the packings. Further, a bearing, e.g., a steel-backed PTFE bearing, can be provided inside of the compression ring to reduce side loading on the valve stem. The compression ring can also include the visual indicator so that a desired loading can be readily recognized. Other objects and advantageous features of the present invention will become readily apparent from the detailed discussion herein.

BRIEF DESCRIPTION OF THE DRAWINGS

A more complete appreciation of the invention and many of the attendant advantages thereof will become readily apparent from the following detailed description, particularly when considered in conjunction with the drawings in which.

DESCRIPTION OF THE PREFERRED EMBODIMENTS

Figure 1:
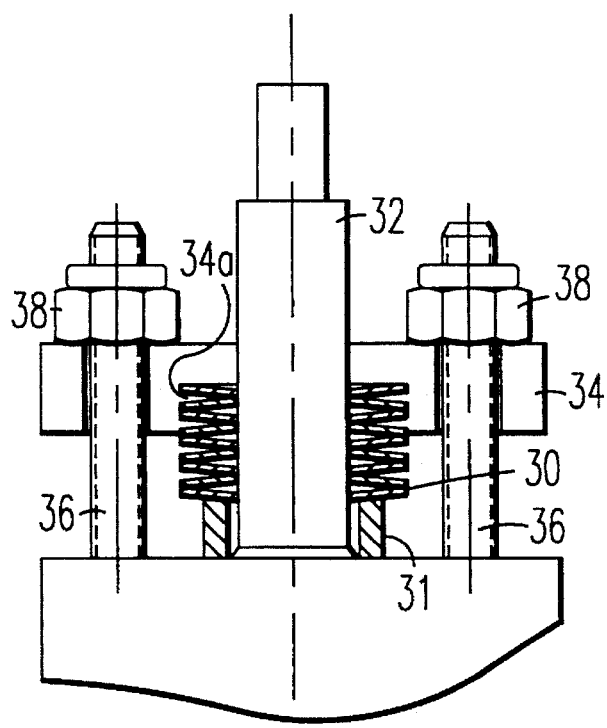
FIG. 1 depicts a conventional loading assembly in partial cross-section.

The present invention will now be described in detail with reference to FIGS. 3A and B, wherein like reference numerals designate corresponding parts. As shown in FIG. 3A, the valve includes a stem 10 which is connected to an actuator (not shown), for controlling the position of the valve. The arrangement of FIG. 3A is in the form of a linear valve, with the stem 10 moving in the axial direction of the stem (up and down in the figure). However, it is to be understood that the present invention is suitable for various other types of valves in need of live loading, such as a rotary valve in which the valve stem 10 rotates about its own axis. In the valve shown in FIG. 3A, particularly where high pressure fluids are passing through the valve, the fluid will tend to leak along the valve stem. To prevent the fluid from leaking along the valve stem 10, packings are provided as indicated at 12. A pair of washers 16 and a wiper ring 18 are also provided beneath the lower packing 12. When the packing is sufficiently loaded, it forms a seal about the valve stem, thereby preventing leakage along the valve stem. A double packed valve is shown in FIG. 3A, with upper and lower packings 12. However, the present invention is also applicable to single packed arrangements.

Figure 2:
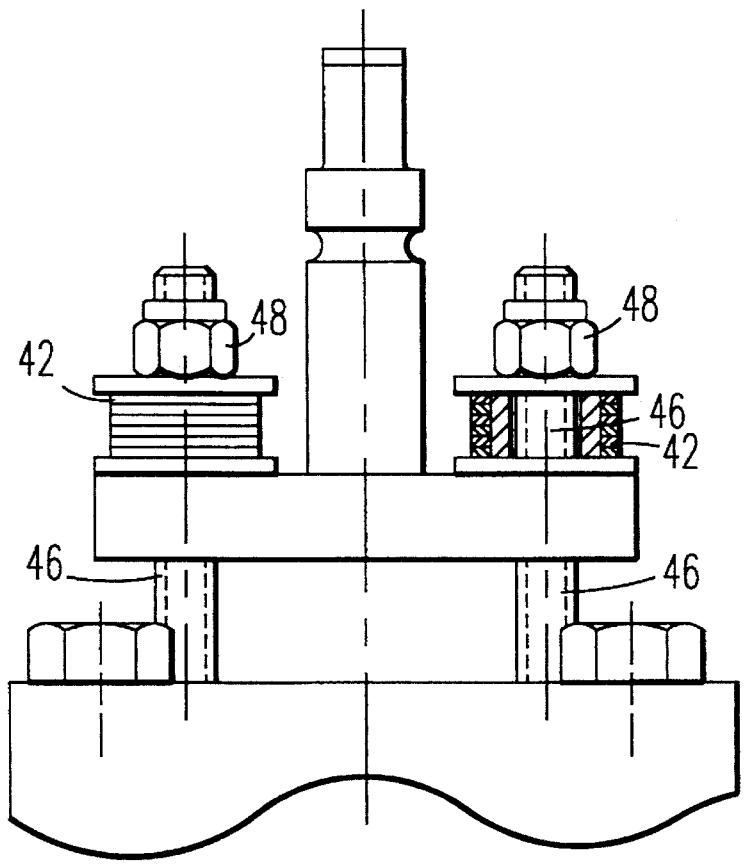
FIG. 2 shows an alternate conventional arrangement for live loading of the packings of a valve.

In accordance with the present invention, it has been recognized that by providing larger belleville springs as shown at 3, more effective use is made of the available volume for the force package (i.e., springs 3). Further, since the amount of deflection for each spring is related to the square of the diameter of the spring, more desirable deflection and loading characteristics can be achieved with a smaller number of springs as compared with the conventional arrangements of FIGS. 1 and 2. Thus, it is much easier to achieve a desired load and deflection, and the desired loading can be achieved utilizing a visual indicator as will be discussed hereinafter. Moreover, since a greater amount of deflection is required to produce a given change in loading, the assembly can more readily accommodate consolidation of the packing while maintaining a sufficient loading on the packing to prevent leakage, despite the use of a relatively small number of springs.

Thus, a relatively small number of larger belleville springs 3 are provided over the valve stem, with additional apertures provided in the springs for accommodating the studs 6 which are connected to the valve bonnet 14.

A compression ring 2 is provided for receiving the spring force from the springs 3, and for transmitting the force to the packings 12. The compression ring advantageously includes a first portion 2a extending between the valve stem and the belleville springs 3 for guiding and positioning of the springs. The portion 2a also assists in preventing any skewing of the springs which may tend to occur upon tightening of the assembly. In addition, a second portion 2b is provided with a diameter larger than the first portion 2a such that the belleville springs 3 abut against the end of the second portion 2b for transmitting the spring force through the compression ring and to the packing 12. Preferably, a polytetrafluoroethylene PTFE) bearing is provided within the compression ring as shown at 1. The bearing 1 preferably is a steel backed PTFE lined bearing which can be pressed into the compression ring 2, thereby reducing the side loading or off-axis loading of the valve shaft, since a proper sliding relationship is established between the stem or shaft 10 and the bearing 1. Thus, in accordance with another aspect of the present invention, improved guiding and positioning of the springs are accomplished with the compression ring 2, while side loading of the stem is prevented, resulting in a more reliable and uniform loading.

Once the stack of springs 3 are provided over the valve stem 10 and the threaded studs 6, a compression plate 4 is mounted above the stack of springs 3, and the hex nuts 5 are tightened to provide a desired loading of the stack of springs 3. Although tightening is accomplished by the nuts 5 in the preferred embodiment, it is to be understood that other tightening members or force applicators could also be utilized if desired. As discussed earlier, since the springs are much larger than in conventional arrangements, a greater deflection per spring is provided upon loading of the springs, and it is possible to achieve a desired loading utilizing a visual indicator. In particular, as shown at 11 in FIG. 3A, a visual indicator can be provided on the first portion 2a of the compression ring 2. The nuts 5 are then tightened until the indicator 11 is visible, indicating that a sufficient load has been applied. Preferably, the color indicator 11 is in the form of a band such that excessive tightening of the nuts is also indicated by the end of the band, or by a second band which is disposed on the compression ring portion 2a after the first indicator 11. Thus, with the indicator 11 provided in the form of a band, the thickness of the band corresponds to the proper loading range for the packings. By way of example, the indicator can have a thickness on the order of 45 thousandths of an inch.

Figure 3B:
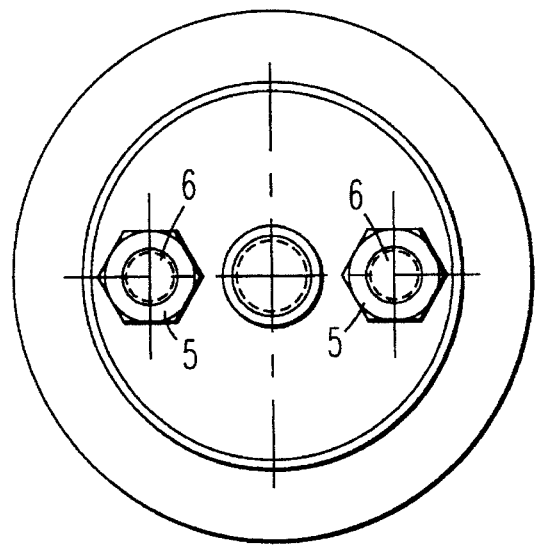
FIGS. 3A–3B respectively depict side and top views of a live loading assembly in accordance with the present invention, with the side view of FIG. 3A shown in partial cross-section.
Figure 3A:
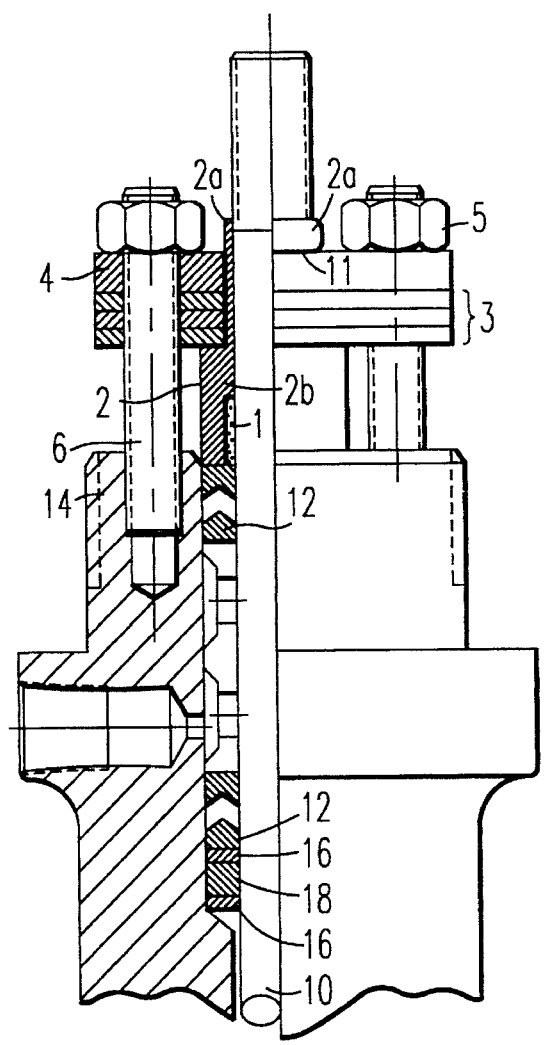

As shown in FIG. 3B, a pair of threaded studs 6 are provided in the assembly, and are arranged symmetrically with respect to the valve stem. However, three or more studs 6 may also be provided depending upon the type or class of valve for which live loading is provided. As shown in FIG. 3A, the studs 6 extend through the belleville springs 3, and thus more effective use is made of the volume or space between the compression plate 4 and the valve bonnet 14. Preferably, the pitch of the threads on studs 6 is less than the thickness of each spring in order to prevent the springs from becoming caught or obstructed by the threads. Alternatively, a sleeve may be disposed about the threads to avoid possible interference.

Figure 4:
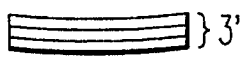
FIG. 4 depicts belleville disk springs arranged in parallel.

Since the force imparted by the springs onto the compression ring is symmetrical about the compression ring at a substantially central location of the springs, small variations in the amount of tightening of the hex nuts 5 with respect to one another do not result in asymmetrical loading about the compression ring, and a uniform loading is provided to the compression ring and thus to the packings 12. In order to vary the amount of loading provided to the packing 12, the number of springs 3 can be varied. For example, for a higher load, a greater number of springs can be provided. Alternatively, the orientations of the springs can be varied. The belleville spring is curved (see, e.g., FIG. 1), and by providing a series orientation (in which the curvatures of the disks are arranged in an alternating fashion, i.e. the curvatures of adjacent springs are in opposite directions) a greater amount of deflection results for a given load as compared with a parallel arrangement in which each of the curvatures of the belleville springs are in the same direction (i.e., the curvatures of adjacent springs are parallel to one another as shown at 3' in FIG. 4). Thus, where a high level of loading is required, for example for a graphite packing, a parallel arrangement of the belleville springs can be utilized. Although the change in load for a given change in deflection with a parallel arrangement is relatively large (as compared with a series arrangement), in a graphite packing typically the amount of consolidation is fairly small, and thus the assembly need not accommodate for great amounts of consolidation of the packing. A teflon packing will consolidate to a greater extent, and therefore, a series mounting of the belleville springs would likely be preferable such that a desired loading can be maintained despite consolidation of the bearing over time.

As should be readily apparent from the foregoing, the present invention provides a simple assembly for providing an accurate, reliable and uniform live loading of a valve packing. The assembly requires a relatively small number of disk springs or belleville springs, and does not have excessive space requirements, since it more effectively utilizes available space as compared with conventional arrangements. Further, the assembly is simpler than the arrangements of FIGS. 1 and 2, since additional machining of the compression plate is not necessary as in the FIG. 1 arrangement, and a much smaller number of springs and other parts are required as compared with the arrangements of FIGS. 1 and 2. Further, the arrangement provides a substantially uniform load about the valve packing, since the disks are maintained in alignment by the compression ring as well as by the threaded bolts or studs, and the springs are thus prevented from skewing upon the application of a compressive force. Still further, as a result of the load/deflection characteristics of the present invention, it is relatively easy to achieve a desired loading, and a visual indicator can be provided on the compression ring to reliably indicate the attainment of a desired load. In addition, the provision of a steel backed PTFE lined bearing reduces side loading of the valve shaft, thereby ensuring that the load is properly and uniformly applied to the packing, while preventing damage or wear to the valve stem.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A valve having an assembly for live loading a valve packing, said valve comprising:

a valve stem;

at least one packing providing a seal about said valve stem;

at least one belleville disk spring including a first central aperture through which said valve stem extends, said at least one belleville disk spring further including a second aperture;

a stud extending through said second aperture of said at least one belleville disk spring;

a compression ring which transmits forces from said at least one belleville disk spring to said at least one valve packing;

a tightening member for applying a force to said at least one belleville disk spring; and a compression member disposed between said tightening member and said at least one belleville disk spring such that said compression member transmits the force applied by said tightening member to said at least one belleville disk spring, and wherein said at least one belleville disk spring contacts said compression member with an annular contact between said compression member and said at least one belleville disk spring;

said at least one belleville disk spring having a radius larger than a spacing between a center axis of said valve stem and a center axis of said stud, and wherein said compression ring includes an annular compression surface which receives force from said at least one belleville disk spring along an entirety of said annular compression surface, said compression ring transmitting force from said annular compression surface to said at least one valve packing, and wherein said annular compression surface has a radius smaller than said spacing between the center axis of said valve stem and said center axis of said stud.

2. The valve assembly of claim 1, wherein said tightening member includes a nut mounted upon said stud.

3. The valve assembly of claim 1, further including a plurality of said studs, said plurality of studs disposed symmetrically about said valve stem, said at least one belleville disk spring including a plurality of second apertures disposed about said first central aperture for receiving said plurality of studs therethrough.

4. The valve assembly of claim 3, further including a plurality of tightening members, each in the form of nuts disposed upon each of said plurality of studs.

5. The valve assembly of claim 1, wherein said compression ring includes first and second portions, said first portion extending through said first aperture of said at least one belleville disk spring such that said first portion is disposed between said at least one belleville disk spring and said valve stem, said second portion having a diameter greater than said first portion to thereby provide said annular compression surface, such that as said tightening member applies a force to said at least one belleville disk spring through said compression member, said at least one belleville disk spring applies a force against said annular compression surface of said compression ring.

6. The valve assembly of claim 5, further including an indicator disposed on said first portion of said compression ring for indicating a desired loading of said at least one disk spring.

7. The valve assembly of claim 6, wherein said indicator includes a colored band located on said first portion of said compression ring.

8. The valve assembly of claim 5, further including a polytetrafluoroethylene bearing disposed radially inside of said compression ring.

9. The valve assembly of claim 1, further including a polytetrafluoroethylene bearing disposed radially inside of said compression ring.

10. The valve assembly of claim 1, wherein said packing is a teflon packing, and wherein a plurality of belleville disk springs are provided, said plurality of belleville disk springs arranged in series.

11. The valve assembly of claim 1, wherein said packing is a graphite packing, said valve assembly further including a plurality of said belleville disk springs, said plurality of belleville disk springs arranged in parallel.

12. The valve of claim 1, wherein said at least one belleville disk spring has a diameter which is substantially equal to a diameter of said compression member.

13. A valve having an assembly for live loading a valve packing said valve comprising:
   a valve stem;
   at least one packing forming a seal about said valve stem;
   a plurality of belleville disk springs, each including a first central aperture and a plurality of second non-central apertures extending therethrough, wherein said valve stem extends through said central aperture;
   a plurality of studs respectively extending through said plurality of second apertures of said plurality of belleville disk springs;
   a compression ring which transmits forces from said plurality of disk springs to said at least one packing, said compression ring including a first portion extending through said central aperture such that said first portion is disposed between said valve stem and said plurality of belleville disk springs, said compression ring further including a second portion disposed between said plurality of belleville disk springs and said at least one packing such that forces are transmitted from said plurality of belleville disk springs to said at least one packing through said second portion;
   a compression plate having a central aperture through which said valve stem extends, said compression plate located such that said plurality of belleville disk springs are disposed between said compression plate and said second portion of said compression ring; and
   at least one tightening member for applying a force to said plurality of disk springs, said at least one tightening member disposed such that said compression plate is located between said tightening member and said plurality of belleville disk springs;
   wherein said plurality of belleville disk springs each have a radius which is larger than a spacing from a center axis of said valve stem to a enter axis of one of said plurality of studs, and wherein a topmost one of said plurality of belleville disk springs contacts said compression plate with an annular contact between said compression plate and said topmost one of said plurality of belleville disk springs; and
   wherein said second portion of said compression ring includes an annular compression surface at a top thereof, and wherein a bottommost one of said plurality of belleville disk springs contacts said annular compression surface with an annular contact between said bottommost one of said plurality of belleville disk springs and said annular compression surface, and wherein said annular compression surface has a radius which is smaller than said spring from the center axis of said valve stem to the center axis of one of said plurality of studs.

14. The valve of claim 13, wherein said first portion of said compression ring extends through said central aperture of said compression plate.

15. The valve of claim 14, wherein said first portion of said compression ring includes an indicator for indicating a predetermined loading of said plurality of belleville disk springs.

16. The valve of claim 13, wherein said compression plate includes a plurality of second apertures through which said plurality of studs extend, and further wherein a plurality of said tightening members are provided, each in the form of a nut and each receiving a respective one of said plurality of studs, and wherein tightening of said nuts upon said studs causes loading of said plurality of belleville disk springs.

17. The valve of claim 16, wherein said first portion of said compression ring extends through said central aperture of said compression plate, said first portion further including an indicator thereon for indicating a predetermined loading of said plurality of belleville disk springs.

18. The valve of claim 13, wherein said plurality of belleville disk springs each have a diameter which is substantially equal to a diameter of said compression plate.

19. A valve having an assembly for live loading a valve packing said valve comprising;
   a valve stem;
   at least one packing forming a seal about said valve stem;
   a plurality of studs;
   a compression plate through which said valve stem and said plurality of studs extend;
   at least one belleville disk spring disposed such that said valve stem and said plurality of studs extend therethrough; and
   a plurality of nuts, one each provided for each of said plurality of studs, said compression plate disposed between said at least one belleville disk spring and said plurality of nuts, such that upon tightening of said nuts upon said studs, said compression plate is urged against said at least one belleville disk spring; and
   wherein said at least one belleville disk spring has a radius larger than a spacing between a center axis of said valve stem and a center axis of one of said plurality of studs, and wherein said at least one belleville disk spring contacts said compression plate with an annular contact between said at least one belleville disk spring and said compression plate:
   the valve further including a compression ring having an annular compression surface receiving force from said at least one belleville disk spring along an entirety of said annular compression surface, said compression ring transmitting force from said annular compression surface to said at least one packing.

20. The valve of claim 19, wherein said at least one belleville disk spring has a diameter which is substantially equal to a diameter of said compression plate.

* * * * *